United States Patent
Kim et al.

(10) Patent No.: US 6,838,120 B2
(45) Date of Patent: Jan. 4, 2005

(54) METHOD FOR MANUFACTURING CARBON/SILICON-CARBIDE COMPOSITE

(75) Inventors: Yun Chul Kim, Daejeon (KR); Yong Gu Won, Seoul (KR); Hyung Sik Lee, Daejeon (KR); Kwang Hyeon Lim, Seoul (KR); Dong Hyuk Sin, Goyang (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 10/073,470

(22) Filed: Feb. 11, 2002

(65) Prior Publication Data

US 2002/0109250 A1 Aug. 15, 2002

(30) Foreign Application Priority Data

Feb. 12, 2001 (KR) .......................................... 2001-6790

(51) Int. Cl.⁷ ............................ B05D 3/02; C01B 31/00
(52) U.S. Cl. ...................................... 427/227; 264/29.7
(58) Field of Search ............................. 264/29.1, 29.7, 264/103, 129; 427/227

(56) References Cited

U.S. PATENT DOCUMENTS

| | | | |
|---|---|---|---|
| 4,238,433 A | 12/1980 | Hillig et al. | |
| 5,422,322 A | 6/1995 | Chen et al. | |
| 5,486,379 A | * 1/1996 | Bouillon et al. | ............. 427/212 |
| 5,618,767 A | * 4/1997 | Benker | ......................... 501/90 |
| 5,968,653 A | 10/1999 | Coppella et al. | |

FOREIGN PATENT DOCUMENTS

| | | |
|---|---|---|
| JP | 3252362 A | 11/1991 |
| JP | 9052777 A | 2/1997 |

* cited by examiner

*Primary Examiner*—Christopher A. Fiorilla
(74) *Attorney, Agent, or Firm*—Scully, Scott Murphy & Presser

(57) ABSTRACT

A method for manufacturing carbon/silicon-carbide composite by a 'One-shot' process including carbonization, heat processing, infiltration, and forming an anti-oxidation layer on surface is provided through the steps of: 1) hardening a stacked carbon/phenolic preform; 2) carbonization and heat processing the preform until the temperature reaches at 2300° C.; 3) infiltrating and sintering the liquid metal silicon within the temperature of 1400~1800° C.; and 4) inducting a compound including $SiO_2$ to gas phase and heat processing it while forming an anti-oxidation layer on the surface within temperature range of 2000° C.~2700° C. (desirably, in the range of higher than 2300° C., and more desirably, at the temperature near 2500° C.). Herein, the carbonization, heat processing, and ultra-high heat processing might be performed at the same time in the step 2) and the step 4) might not be performed.

19 Claims, 6 Drawing Sheets

METHOD FOR MANUFACTURING CARBON/SILICON-CARBIDE COMPOSITE

BACKGROUND OF THE INVENTION

1. Field of the Invention

The present invention relates to a method for manufacturing carbon/silicon-carbide composite used as a thermal resistant and an anti-oxidation component, in more detail, relates to the heat processing and infiltration process needed for the manufacturing method.

2. Description of the Background Art

A rocket engine using a solid and liquid fuel needs the material that has high physical properties chemically and mechanically. This material has many advantages that improves the function of the rocket engine and reduces the weight. And in order to improve the anti-oxidation function of carbon/carbon composite commonly used as a material of thermal structure, an anti-oxidation layer is formed on the surface of the material or a reinforcement and a matrix are replaced with the material strengthened in the anti-oxidation function. This carbon/carbon composite improved as described above is called 'Advanced Carbon Carbon' or 'Reinforced Carbon Carbon', and it is applied to the design and fabrication of the components in the thermal-resistant structure. This material is usually used in components of the ultrasonic aeroplane and liquid propulsion section, after 1990s, new material and process is developed and used as an important component of the solid propulsion section. In the burning environment of the solid propulsion section of high temperature (3000K) and high pressure (1500 psi), the method that increases the anti-oxidation of the inside of the material is used as the anti-oxidation coating method of the thermal resistant components because rapid abruption near the barrier of anti-oxidation layer and the matrix layer (especially, near the nozzle throat) make the heterogeneous ablation generate. Specifically, the object of the material development is decided in the way of adding high value and of protecting the ecosystem, the development of composite containing ceramic, which can lower the pollution, is increased. Carbide, Boride, Nitride, Oxide, Silicede, and about 80 other compounds are known as carbon fiber reinforced fire resistant chemical compound. In the development of these materials, the physical and chemical affinity of the respective factors, interaction between the phases, and the effect by chemical and diffusion reaction are to be considered. Because the three effects described above apply as an important factor in the operation process of high temperature and in the real application circumstances. The physical characteristic of the compound is decided by the two former factors, the latter decides the processing condition and the maximum temperature that the material can endure. In hot temperature, the carbon and the refractory material form a eutectoid, although the sublimation point of the carbon is about 3000° C., when it becomes a compound like Carbide, Boride, Nitride, Oxide, the melting point is lowered gradually to about 1000° C. Carbide compound is used as ultra-high temperature compound material because it has a high melting point and can maintain its mechanical properties for a long period in the high temperature among those compounds.

The chemical ablation of the carbon/carbon composite begins with the oxide reaction of air pore inside the material and of activated carbon, accompanying with diminishing of the mechanical properties of the material because of burning the carbon fiber itself. Principal reason for ablation of the carbon/carbon composite is the oxide reaction made in the air pore inside the material in air environment (pressure 0.01~1 atm), therefore raising of the oxide-resistance was considered significantly in the process of developing the carbon-based composite. Usually, two methods for increasing the oxide-resistance were considered. First method is to restrain the oxide reaction by forming a SiC layer on the carbon/carbon composite. However, as the temperature is increased, the oxide reaction between the carbon and the oxygen reaches to the boundary of the coated layer, then the layer is ablated rapidly. The ablation of the coated layer is also caused by the difference of the thermal expansion coefficient between the matrix layer and the coated layer. And, the components of the ultrasonic aeroplane are mechanically aged by impacting with granules of gravel, sand, and hail, etc. The second method is to add carbide compound, that is, a refractory compound to the material in order to increase the mechanical strength, stiffness, thermal shock resistance, and oxide-resistance of the carbon fiber compound material. A gas phase infiltration method and liquid phase infiltration method are used and usually, gas phase infiltration method is commercially used and components using that method are produced. However, initial investment costs too much and fabricating period takes more than 5 months.

On the other hand, a sintered product using metal silicon is disposed in the U.S. Pat. No. 4,238,433, but that method has difficulty in using complex preform and it is used usually as powder preform and 2 dimensional geometric form. Also, a high-density silicon carbide/carbon-graphite composite and fabrication method of the same is disposed in the U.S. Pat. No. 5,422,322, the method is to compound the carbon and inorganic matter formed in powder shape with a solvent. This method increases the SiC content inside while increases the carbon content on the surface, and is used to mechanical seal component needed lubricating ability and to bearing. However, in making a large structure, the compounding process is very complex and it is hard to observe the compound consumption at a certain rate. In addition, because of the low thermal shock resistance that the powder preform has, it can not be used in high heat load.

A 3 dimensional preform based on the carbon/phenolic preform having economical advantages has not been used because it is hard to adjust carbonization condition and high temperature heat processing condition and in the infiltration process of the metal silicon, the carbonized product is damaged, thereby thermal and structural properties become worse. Therefore, it is not applied to produce components for thermal structure.

SUMMARY OF THE INVENTION

Therefore, an object of the present invention is to provide a method for manufacturing Carbon/Silicon-carbide composite by a One-Shot process including a carbonization, heat processing, infiltration and forming the anti-oxidation layer on the surface unlike the conventional art.

To achieve the object of the present invention, there are provided the steps of 1) hardening the stacked carbon/phenolic preform; 2) carbonizing the phenolic resin and heat processing it, while the temperature is risen below 2300° C.; 3) infiltrating and sintering said hardened and carbonized preform by infiltrating it with liquid metal silicon in the temperature between 1400° C. and 1800° C.; and 4) inducting the compound including $SiO_2$ to have gas phase in the temperature range of 1400° C.~1800° C. (desirably, in the temperature exceeding 2300° C. and more desirably, in the temperature near 2500° C.) and ultra-high heat processing as forming the anti-oxidation layer on the surface of the compound.

Herein, the phenolic preform can be made using one method among the methods of press molding, internal and external compression of tape wrapping, filament winding, making 3D preform by sewing the 2D fabric with a thermal resistant fiber, and involute method. And the thermal resistant fiber used above sewing method can use one of carbon fiber, quartz fiber, silica fiber, and tungsten line.

Also, the carbonizing, heat processing and ultra-high heat processing can be performed at once in the second step, and the fourth step may not be performed.

And in the manufacturing process described above, it is desirable to make a discharging passage of the dissolute gas by piercing on the hardened test piece in the second step, and it is more desirable that the discharging passage is made by punctuating holes having diameter of 0.5~1.5 mm with 5~20 mm interval in case of rectangular hardened product or product having cylinder shape with empty space inside.

Also, it is desirable that, in the second process of carbonizing and heat processing, graphite and coke powder is put in a graphite box with a hole and wrap the surface of test piece as thick 1.5 times as the test piece so as to discharge the reacting gas smoothly and to prevent the oxidation of the preform.

It is also desirable that the metal silicon with high purity of 98~99.9% is used when sintering is performed as the weight of 110~130% comparing with that of carbonized product.

It is also desirable that the step of coating the test piece with the Boron Nitride (BN) compound consisting of BN at the rate from 70% to 80%, of acetone of 10~20% rate, and 0~10% of water is included after the third step is performed in order to reduce difficulty of second processing needed after sintering.

Generally, the composite material used in ultra-high temperature is required to have the characteristics as follows.

1. Fiber used as reinforcement should be as strongest as possible, its mechanical properties should be maintained till the temperature of 2100° C. and the expansion rate of the fiber length as the temperature rises should be low. In addition, the mechanical properties of the fiber should be hardly changed.

2. The matrix should have qualified thermal and mechanical properties in high temperature environment, should protect the fiber from the oxidation environment and maintain the hardness of the fiber.

3. Binding capacity of boundaries of matrix and reinforcement should be adjusted as to maximize the mechanical properties of reinforcement.

A mechanical property of the composite material is decided by the property of the reinforcement, property of the matrix, and compounding condition of reinforcement and matrix. And the property of the composite is also related to the orientation of the reinforcement fiber. The property of the carbon fiber-carbide composite is decided by the uniformity of the carbide matrix, phase changing, crystal structure, the size of grain, purity of the material, and the existence of air pore, and crack. SiC material forms an anti-oxidation layer by reacting with oxygen in high temperature, maintains its hardness till the temperature of 1700° C. and its coefficient of thermal expansion is nearly same as that of carbon fiber. Covalent bonding of carbon and carbide has advantage of maintaining the stability of crystal structure in hot temperature for a long period by restraining chemical reaction with other compounds.

The present invention provides a One-Shot process including high temperature heat processing and infiltration of preform including carbon, a surface processing method for preventing reacting product from forming on surface of the material and high temperature heat processing period controlling shape changing, forming a 3D reticular structure controlling the chemical reaction of carbon fiber and liquid metal silicon, and extinguishing the non-reacted metal silicon remaining inside and forming the anti-oxidation coated layer on the surface using chemical vapour reaction (CVR), which is needed in the manufacturing process of C/SiC composite.

According to the present invention, the manufacturing process of C/SiC, which is used in order to increase the efficiency of missile nozzles, engines of ultrasonic aeroplanes, valves used in high temperature environments, atomic power plants, can be simplified and the function of fire-resistance, oxide-resistance, and structural function are satisfied with the method according to the present invention. In addition, the producing period and cost can be greatly lowered compared with the conventional method of chemical vapour infiltration (CVI). And the result of the thermal resistance test being described later shows that it has good reproducibility.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
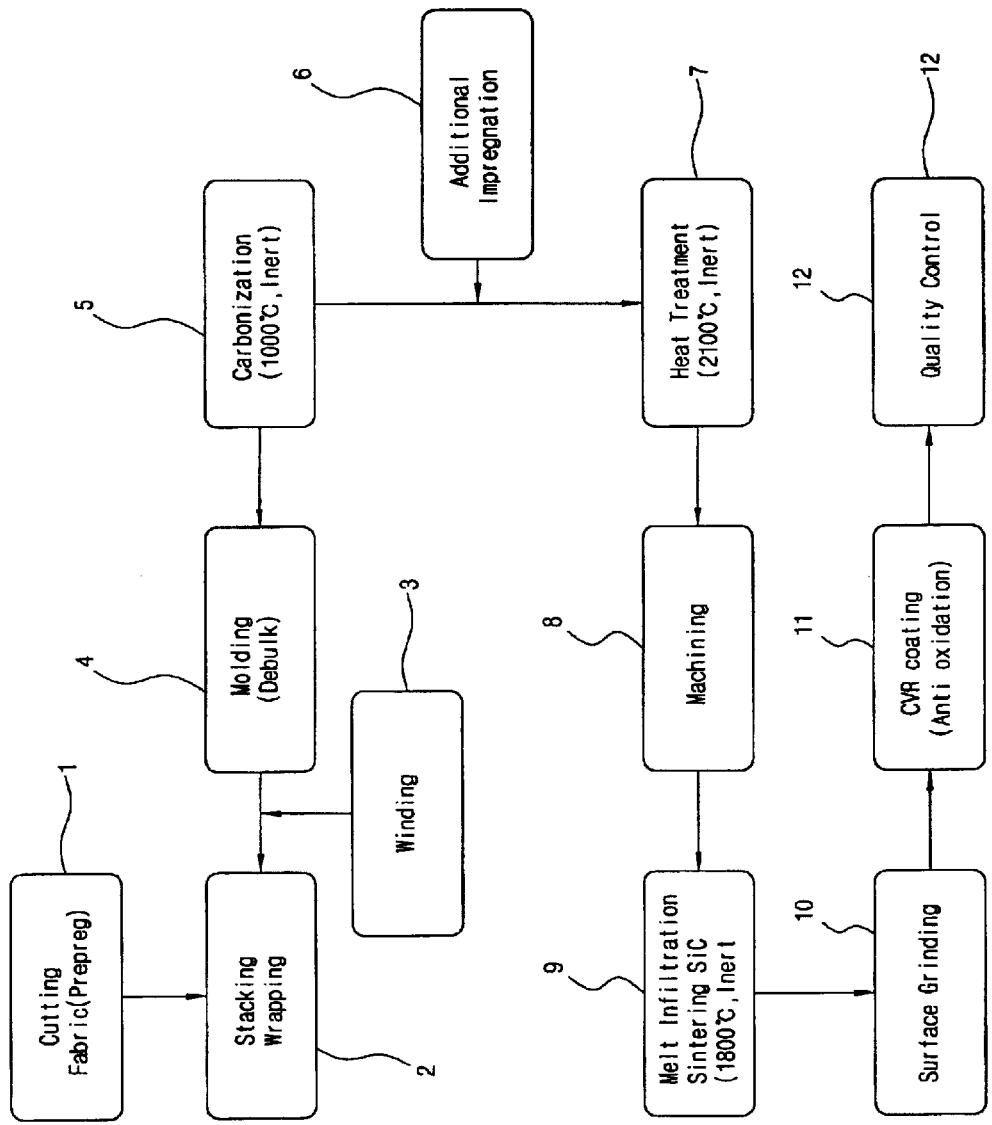
FIG. 1 is a view showing an embodiment of manufacturing process of the C/SiC composite according to the present invention.

Hereinafter, the present invention will be explained in more detail with reference to the FIG. 1 showing an embodiment of manufacturing process of C/SiC composite according to the present invention. As shown in claims, FIG. 1 includes selective steps, and the order of the process may be changed.

A. manufacturing of carbon/phenolic preform

Figure 2:
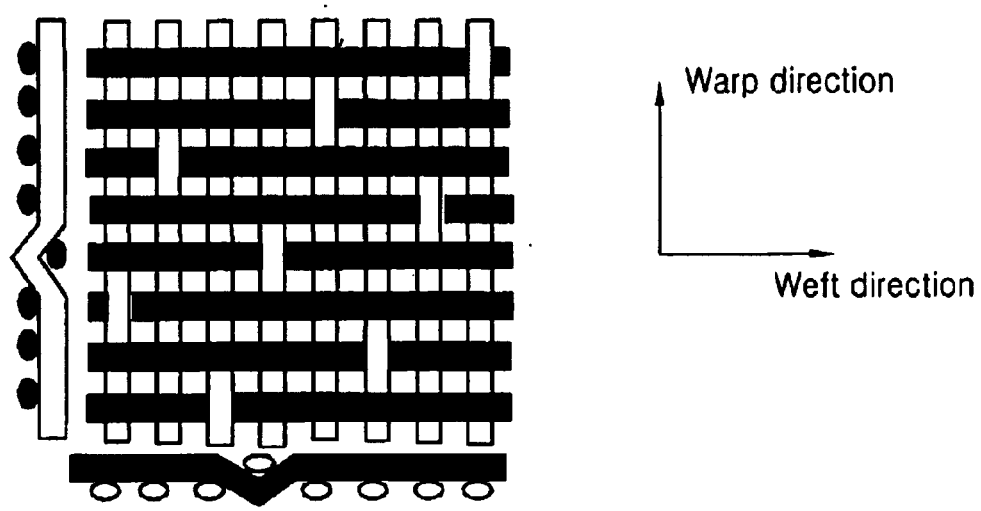
FIG. 2 is a model diagram showing a layer of fabric preform.
Figure 3A:
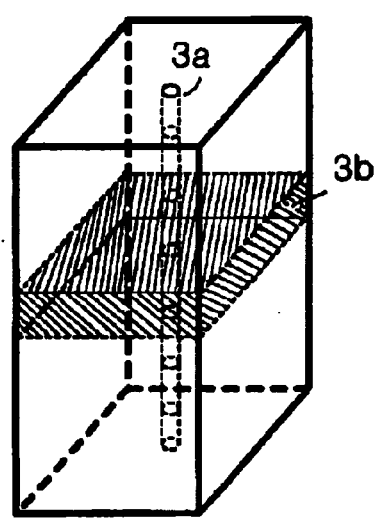
FIGS. 3a and 3c is showing 2 dimensional and 3 dimensional fabric preform respectively.
Figure 3B:
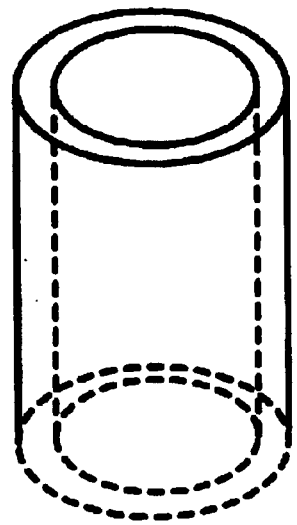
Figure 3C:
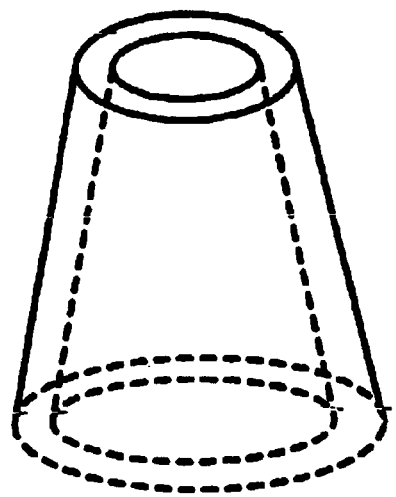

This process covers 1~4 of the FIG. 1. The 2D and 3D preform (FIG. 3) is made by the method of tape wrapping, involute lay up, filament winding, press molding with carbon/phenolic prepreg (FIG. 2) material using the carbon fibers from PAN field, and pitch field. The preform is designed, stacked and formed as 150~200% of thickness and 120~150% of length comparing to desired preform in consideration of contracting in the process of carbonization and heat treatment. In case of tape wrapping, in order to minimize residual stress and crinkle inside-out method is used. In case of filament winding, carbonization harvest rate is raised by adjusting content of resin to be 50%. If the structure has T or L shape, needling and weaving method using fibers and fabric make the form, and later the resin is infiltrated and hardened using the resin transfer molding (RTM) method.

B. carbonization and high temperature heat process of the hardened product

This process covers step 5~step 7 in FIG. 1. The heat treatment interval is to be changed with reference to the formation and the material used, and the heat treatment is performed in order to increase the harvest rate and to make endurable in thermal shock when sintering process is performed with the metal silicon. At first the thermal cracking is made and the reaction gas made by the thermal cracking increase the pressure so that the crack is made inside material. In order to discharge the reaction gas smoothly and to prevent the oxidation of preform, the preform is put in a graphite box with a hole fabricated specially to carbonization and heat processing, and the box is filled with graphite powder so that the oxygen can not be inserted in accordance with the present invention. Also, to guarantee smooth discharging of the reaction gas, in case that the fabricated product is a rectangular shape with 40 mm thickness, holes of 0.5~1.5 mm (FIG. 3, 3a) diameter are penetrated with 5~20 mm interval along with the periphery of the rectangular, and the hole penetrates the rectangular or is deep as more than 50% of depth of the rectangular. Or in case that the fabricated product has a cylinder shape of 40 mm thickness, holes of 0.5~1.5 mm diameter are penetrated with 5~20 mm interval along with the periphery of the cylinder, and the hole penetrates the cylinder or is deep as more than 60% of depth of the cylinder. The carbonization atmosphere is to be maintained as inert atmosphere, desirably, helium, argon, and hydrogen gas is used. And in order to prevent the oxidation caused by diffusion of the air, graphite powder is packed on the surface of the material as more than 30 mm thickness. The speed of temperature rising is maintained as 2° C./min until the temperature is 300° C., and at the temperature of 300° C., temperature is maintained at least one hour. The speed of rising temperature is maintained as 1° C./min until the temperature reaches 680° C., which is assumed as maximum thermal cracking temperature of the phenolic resin, and when the temperature reaches at 700° C., the temperature is maintained at least two hours. And, the speed is maintained as 1° C./min until the temperature reaches at 800° C., at which the thermal cracking is almost finished, and constant temperature is maintained for two hours at 800° C. Temperature rises as 5° C./min till 1000° C., and is maintained for one hour at 1000° C. And temperature rising speed is 3° C./min till 1500° C., constant temperature is maintained at 1500° C. The speed is raised as 5° C./min until the temperature reaches 2300° C. which is final heat processing temperature, when the temperature reaches at 2300° C., the temperature is maintained at least for four hours. After the carbonization and heat process are finished, the block is cooled naturally. The block completed in carbonization and heat process is fabricated precisely so that the fabrication allowance is within 0.2~0.4 mm.

C. infiltration and sintering reaction of the liquid metal silicon

Figure 4:
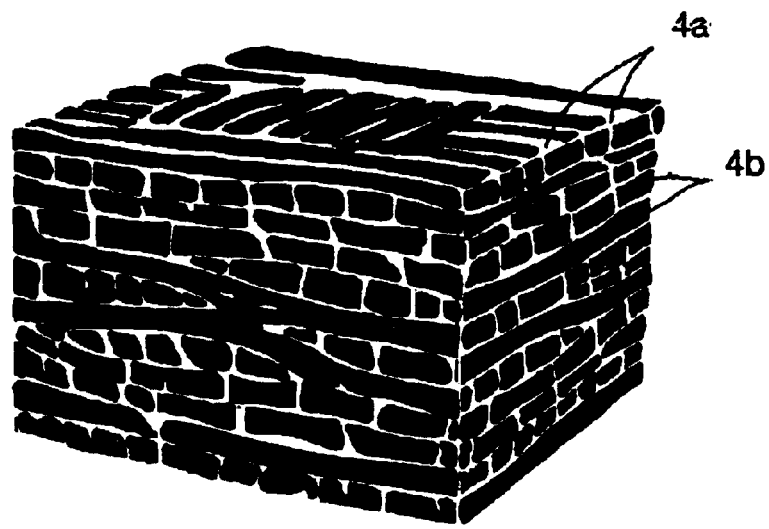
FIG. 4 is a model diagram of fine structure of C/SiC composite according to the present invention.

This process covers step 9 in FIG. 1. A 3D reticular structure is formed after the reaction is finished as shown in FIG. 4. If the metal silicon becomes silicon carbide by reacting with carbonized product, the volume is increased comparing with that of pre-sintering reaction, and stress caused by volume increasing can be applied to the air pore inside the product. Because of that, sufficient air pore should be made as 5~10% more than needed through heat processing before the infiltration of the metal silicon is performed.

The infiltration and the sintering of heat processed carbonization product is performed by 1) attaching metal silicon mixed with the supplement to surface of the block and rising the temperature; 2) wrapping the entire block with metal silicon powder and rising the temperature; and 3) putting the block in liquid metal silicon of high temperature melted in other vessel previously.

Because the fusion Si makes the surface of the carbon wet, the reaction is performed rapidly in early stage and most SiC layer formed in this stage, that layer prevents the diffusion of Si and C. The sintering temperature can be varied from 1400° C. to 1800° C. in accordance with the kind of the carbon fiber used making preform. If the carbon fiber is T300 in PAN field, sintering is performed at the temperature of 1500° C.~1800° C., and the carbon fiber is in Pitch field, sintering process is performed at 1700° C.~1800° C. Metal silicon used in sintering is high purity single crystal of 98~99.9% purity, 110~120% of weight comparing to that of carbonized product. The size of the product in sintering furnace is nearly same with that of final product, therefore the compounds generated the outer surface of the product because of the non-reaction should be removed. This can be removed by coating the BN compound on the surface of heat processed test piece. That is, suspension composed with BN 70~80%, acetone 10~20%, and water 0~10% is coated on the surface with a brush and dried in the air. The BN layer formed on surface of the material is flowed down the surface when the metal silicon becomes liquid metal, and it reduces the difficulty of second fabrication needed after sintering.

Figure 5:
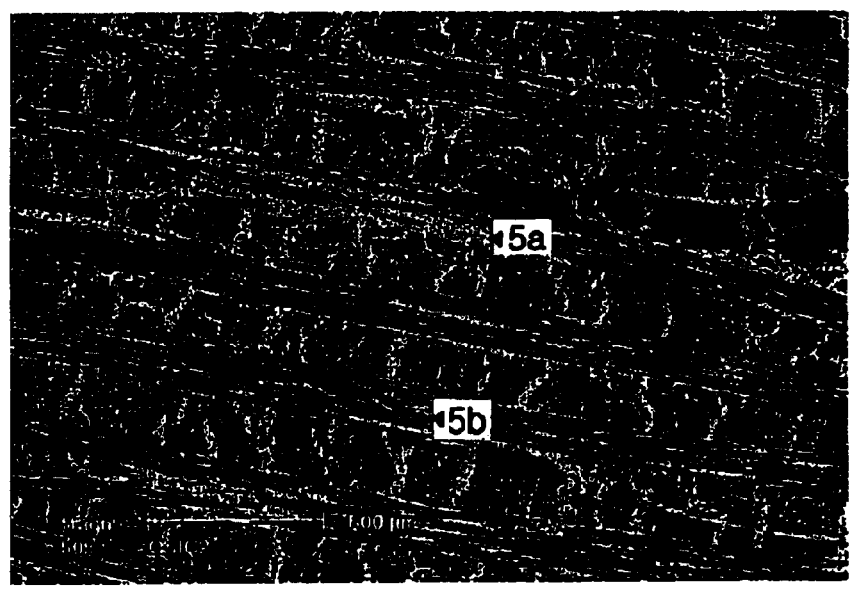
FIG. 5 is an electron microscope photograph of fine structure of C/SiC composite according to the present invention.

Sintering temperature maintaining period should be adjusted by the form of the preform and the material used, in case of rectangular preform of 40 mm thickness and 100 mm width, which is consisted of T300 carbon fiber, sintering temperature maintaining period is below 3 hours at the temperature of 1700° C. Temperature rising speed is varied in accordance with the kind of heating element, but there is no limit of speed at temperature below 1000° C., and temperature rising speed is 10° C./min till the temperature reaches 1400° C., at which the metal silicon melts, and maintain the temperature for half an hour. Until the temperature reaches 1700° C. the speed is 20° C./min, and temperature is maintained for 3 hours at 1700° C. after that the temperature of the heat processing oven should be lowered. If the apparent density of the material is below 2.1 g/cm$^3$, the sintering reaction process should be performed one more time. However, the sintering temperature of second sintering process is higher than that of first sintering process by 20° C., it is for reallocating the distribution of the inside air pores. The fine structure of the sintered material is shown in FIG. 5, white looking part of the figure is SiC formed by reacting carbonized product with the metal silicon, and black looking part is represented bunch of carbon fiber.

D. final heat processing and forming anti-oxidation layer

This process covers step 10~step 12 in FIG. 1. No matter how good the infiltration condition is, all the air pores formed inside and outside of the material can be removed. The air pores formed inside are removed by second sintering method. And air pores formed outside are removed by inducting the $SiO_2$ into the gas phase and reacting with carbon and metal silicon remained as non-reacted, so as to form the silicon-carbide layer (CVR, Chemical Vapour Reaction). Compounds, which are used in that reaction, are $SiO_2$ (73 wt %), SiC (18 wt %), and C (9 w %). Reaction temperature is 2500° C. at maximum, reaction period is for 12 hours.

Surface grind is performed in order to increase the surface roughness. If the material is made of SiC, that has high degree of hardness, so the grinder made of diamond should be used. The general wrapping apparatus is used in case of plain surface, but in case of the material having circular arc and curve, a jig (grinding bar) is to be made first, and diamond is coated on that grinding bar. This grinding process is originally applied to the completed product. However, because the CVR process is varied from the surface roughness of the material, grinding process might be performed before the CVR process.

The present invention will now be described as follows with reference to the embedded implements.

First Implement

Figure 6:
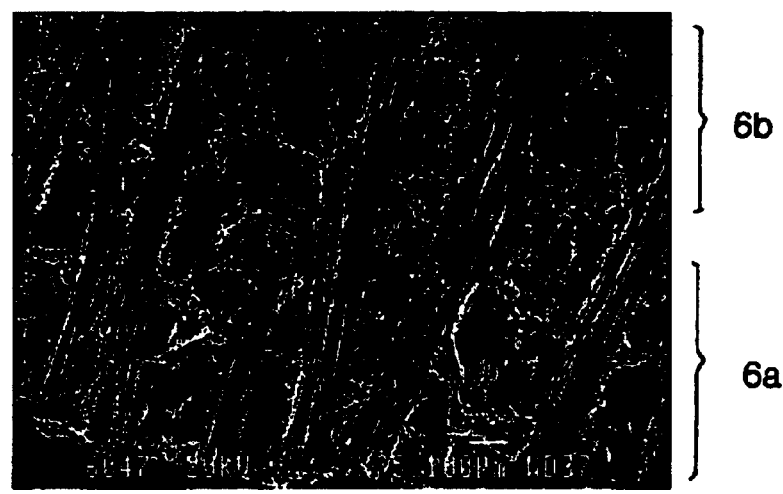
FIG. 6 is an electron microscope photograph of fine structure of the C/SiC composite according to the present invention after high temperature ablation-resistant test.
Figure 7:
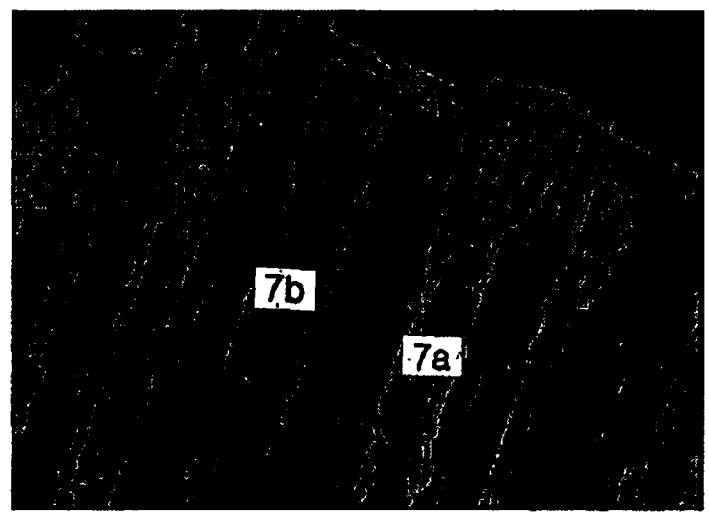
FIG. 7 is a photograph showing the fine structure of the C/SiC composite of the present invention after direct exposure to high-temperature flame.
Figure 8:
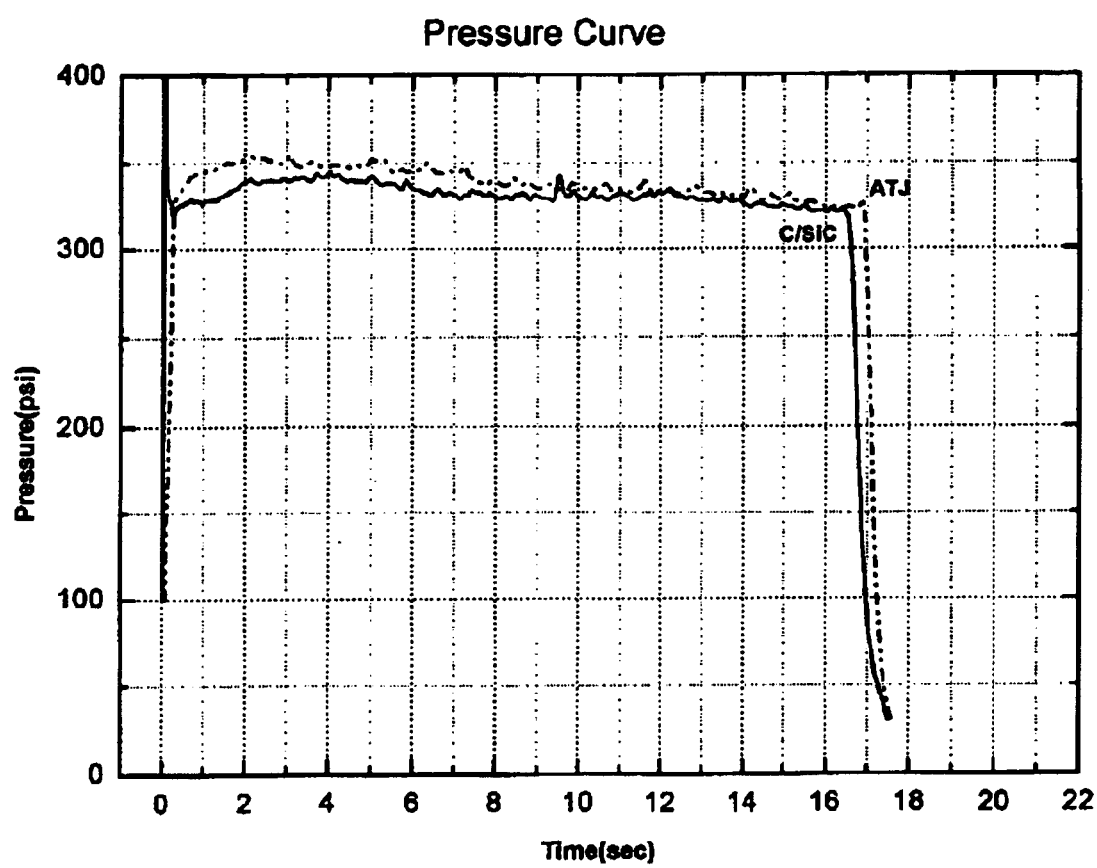
FIG. 8 is a pressure change curve measured the C/SiC composite of the present invention applied to a burning test using a solid propellant fuel.

The carbon phenolic preform was cut with 100 mm width and was formed as a rectangular box with 60 mm thickness using the press molding method. To harden the product, it was maintained as itself at the temperature of 140° C. for four hours, and heated at the speed of 1° C./min till the temperature reaches to 200° C. Then, it was maintained at the temperature of 200° C. for 12 hours, and cooled down below the temperature of 50° C. for 5 hours. And holes of 1 mm diameter and 40 mm depth were penetrated in the middle of the product with 40 mm interval. The heat processing period including carbonization process was like follows. To begin with, the product was maintained at the temperature 300° C. at least for an hour, heated at the speed of 1° C./min till the temperature reaches at 680° C., maintained at least for 2 hours when the temperature reaches at 700° C., and again maintained at the speed of 1° C./min till the temperature reaches at 800° C., when the temperature reaches 800° C. the product was carbonized while being maintained for 2 hours in the first oven. Then, the product was moved to the second oven, heated at the speed of 5° C./min till the temperature reaches at 1000° C. and maintained at 1000° C. for an hour, and heated as the speed of 3° C./min till the temperature reaches at 1500° C. and maintained at 1500° C. for an hour. After that, the product was moved to the third oven and the high-temperature heat processing was performed. That is, the temperature rose at the speed of 5° C./min till 2300° C. and the temperature was maintained as itself at least for 4 hours when the temperature reaches at 2300° C. After carbonization and heat processing were finished, the product was cooled down at room temperature. And the product is fabricated precisely so that the fabrication allowance was within 0.2 mm~0.4 mm in accordance with objects of using. The sintering process was performed at the temperature of 1730° C., an high purity metal single crystal 800 g of 99.9% purity was used for sintering. BN was coated on the surface of carbonized product about 0.5 mm width. Then the product was dried at 23° C. atmosphere. Sintering reaction was continued for 3 hours and the density of the glycerin fluid after sintering was 2.2 $g/cm^3$. In order to resist oxidation and remove the surplus metal silicon, reactant was packed around the sintered product, and the CVR reaction was performed for 5 hours in a high temperature heat processing furnace of the temperature of 2500° C. The density of final product was 2.1 $g/cm^3$ and in order to increase the surface roughness, the product was ground by the grinder coated with artificial diamond. The components of nozzle throat was used to test the thermal resistance and the ablation resistance, and the reaction pressure was 550 psi in average, temperature of the combustion tube was 3200K, and the combustion period was 20 seconds. The pressure in the blast chamber was hardly changed, and also the diameter of the nozzle throat was hardly changed. The result shows that the product can be used in the liquid engine for combusting for long period. In the nozzle throat test, wherein the pressure of the combustion tube is 300 psi, using the solid propellant fuel, the coefficient of ablation was $1.87 \times 10^{-4}$ ($mm^{1.2}/sec/psia^{0.8}$), and the result is nearly same as that of carbon/carbon composite of 1.8 $g/cm^3$ density. The FIG. 6 is showing the fine structure of a test piece, which is exposed in the flame directly, and it is divided into two parts, thermal cracking part 6a and non-reacted part 6b. As shown in FIG. 7 which is enlarging the thermal cracking part 6a, the bunch of carbon fiber used as a reinforcement maintain its shape as it was. However, dropwise shape including the silica ingredient, which is hardened SiC coated layer formed on outside of carbon fiber 7a after it melted by the heat, is shown. As shown in the pressure curve FIG. 8 which is obtained in the combustion test using solid propellant, the function of C/SiC composite used as nozzle throat has 95% function of the graphite.

Second Implement 300 pieces of carbon/phenolic preform are cut to have all same patterns with each other, and stacked into a metal mold using involute stack method. When the preform are stacked, the suspension composed of BN and carbon black powder is applied to the preform while heating. The length of fabricated preform is 150 mm, maximum outer diameter is 150 mm, and minimum outer diameter is 70 mm. The preform is totally hardened in an autoclave using heat and pressure. Post-hardening, the preform is maintained at the temperature of 140° C. for 5 hours, and the temperature is risen as 1° C./min till the temperature reaches at 200° C. The temperature is maintained for 12 hours at 200° C., and the preform is cooled down for 5 hours at the temperature below 50° C. Holes with 1 mm diameter are penetrated at least 30 mm interval to circumference direction and vertically to the outer surface on the parts that has thickness larger than 50 mm. In addition, holes with 1.5 mm diameter and 10 mm depth are penetrated at 20 mm interval to length direction. The carbonization and heat processing condition are same with that of the first implement. However, in order to discharge the thermal cracking gas to outside of the material sufficiently, temperature rising speed is 1° C./min between the temperature of 300° C. and 700° C. wherein the thermal cracking happens most. And in order to increase the crystallization rate of carbonized product which is made by carbonizing of the phenolic resin, the temperature is maintained for 5 hours at maximized heat processing temperature 2500° C. The sintering process is performed as the same way with that of the first implement, and the sintering is maintained for 7 hours with regard to the reaction of carbon black and the liquid metal silicon. The BN protects the carbon fiber from the attack of the liquid metal silicon during the sintering process. Moreover, the tenacity is increased by greater than 20% as compared to the tenacity of the product when the BN is not present.

Third Implement

A parting compound was coated on the surface of the metal mandrel first, and the metal mandrel was wound as a cone shape with maximum outer diameter of 150 mm, minimum outer diameter of 100 mm, and thickness of 10 mm using prepreg tape or a bunch of fiber infiltrated in phenol resin before. Used prepreg was composed of 70 wt % of fiber and 30 wt % of resin. After the stacking is finished, the prepreg is hardened for 2 hours at the temperature of 80° C., 2 hours at 120° C., and 3 hours at 150° C. in a forced convection hot blast oven. Post-hardening is made by using the method used in the first implement. Carbonization and heat processing is performed using the method used in the first implement. And the sintering, final heat processing and anti-oxidation layer forming are performed also using the method used in the first implement. The density of the final product is 2.3 g/cm$^3$.

Fourth Implement

Carbon/phenolic prepreg is cut to be 30 mm width, and 45° angle to the Warp direction, so continued tape is made. The tape is laminated to a charcoal mold slopped as 30°, meanwhile, certain tenacity is applied to the tape continuously. Hardening, post-hardening, carbonization, heat processing, and sintering is performed using the method used in the second implement, and anti-oxidation coating is made by the method of the first implement. The density of final product is 2.2 g/cm$^3$. The prepreg is exposed to the oxygen-acetylene torch of the temperature 1800° C. for 10 minutes for thermal resistance and oxide-resistance test. On the surface that was directly exposed to the flame, white silica powder formed by oxidation of the silicon carbide is formed. And the weight of the prepreg is hardly changed. Cracks are not shown inside or outside.

Fifth Implement

Carbon fabric (eight-harness satin, plain weave) is stacked up to 200 mm height as being coated with the boron nitride (BN) in a jig of rectangular box made of graphite. The reinforcement corresponding to Z-axis is sewed using carbon fiber (or quartz, silica, or tungsten) at 5 mm interval. The preform is pressed and fixed so that the minimum density is larger than 1.5 g/cm$^3$. And the preform is infiltrated and made to be B-stage state in the infiltration furnace, in order that the preform is composed of 30 wt % of phenol resin, 10 wt % of silicon carbide powder, and 60 wt % of carbon fiber. The preform is pressed by the press of 1000 t and is applied by the temperature period applied in the first implement. Post-hardening, carbonization, heat processing, and sintering are performed using the method in the second implement. And the anti-oxidation layer is coated by the method in the first implement. The density of final product is 2.3 g/cm$^3$.

According to the present invention, fabrication process of C/SiC, which fabricated in all developed country as a material for improving the efficiency of missile nozzle, ultrasonic aeroplane engine, valve for high temperature, and atomic power plant, can be simplified. And the thermal resistance, oxide-resistance function, and structural function are satisfied with the fabrication method according to the present invention. Moreover, fabrication time and cost can be reduced greatly comparing to those of the conventional method, and composite material with high thermal resistance can be provided.

What is claimed is:

1. A method for manufacturing carbon/silicon-carbide composite comprising the steps of:
   1) hardening a stacked carbon/phenolic preform;
   2) subjecting said preform to carbonizing and heat processing conditions up to 2300° C. sufficiently to carbonize said preform;
   3) infiltrating liquid metal silicon into said preform to react said silicon with carbon in the preform to form silicon-carbide and simultaneously sintering said hardened and carbonized preform between the temperatures of 1400° C. and 1800° C.; and
   4) forming an anti-oxidation layer on the surface of said hardened and carbonized preform by introducing gaseous SiO$_2$ to react with any remaining unreacted carbon and silicon, while heat-processing said hardened and carbonized preform within the temperature range of 2000° C.–2700° C.

2. The method according to claim 1, wherein the carbon/phenolic preform is prepared by a method selected from the group consisting of:
   press molding, tape wrapping with internal and external compression, sewing 2-dimensional fabrics with thermal resistant fiber to make a 3-dimensional preform, and the involute method.

3. The method according to claim 2, wherein the fiber used for sewing is one of carbon fiber, quartz fiber, silica fiber, or tungsten line.

4. The method according to claim 1, wherein a discharge passage of dissolute gas is made by making holes on the hardened preform in step 2).

5. The method according to claim 4, wherein the discharge passage is made by making holes of 0.5 mm~1.5 mm diameter with 5 mm~20 mm interval if the hardened preform is rectangular box shape.

6. The method according to claim 4, wherein the discharge passage is made by making holes of 0.5 mm~1.5 mm diameter with 5 mm~20 mm interval if the hardened test piece is hollow cylinder shape.

7. The method according to claim 1, wherein graphite and coke powder are put into a graphite box with a hole and wrap up the entire surface of the hardened preform as thick as 1.5 times of maximum thickness of the hardened preformed when carbonization and heat processing are performed in the step 2).

8. The method according to claim 1, wherein high purity metal silicon of 98%~99.9% silicon purity is used as 110%~130% weight comparing to that of carbonized product.

9. The method according to claim 1 further comprising a step of coating boron nitride compound composed of 70~80% BN, 10~20% acetone, and 0~10% water on the surface of test piece after the step 3) is finished.

10. The method according to claim 1 which includes the step of forming an anti-oxidation layer on the surface of said hardened and carbonized preform by introducing gaseous SiO$_2$ to react with any remaining unreacted carbon and silicon, while heat-processing said hardened and carbonized preform within temperature range of 2000° C.–2700° C.

11. A method for manufacturing carbon/silicon-carbide composite comprising the steps of:
   1) forming a carbon/phenolic preform by stacking carbon/phenolic fibers/fabric
   2) hardening the carbon/phenolic preform;
   3) subjecting said preform to carbonizing and heat processing conditions up to 2300° C., sufficient to carbonize said preform;
   4) infiltrating liquid metal silicon into said preform to react said silicon with carbon in the preform to form silicon-carbide and simultaneously sintering said hardened and carbonized preform between the temperature of 1400° C. and 1800° C.; and 5) forming an anti-oxidation layer on the surface of said harden and carbonized preform by introducing gaseous SiO$_2$ to react with any remaining unreacted carbon and silicon, while heat-processing said hardened and carbonized preform within the temperature range of 2000° C.–2700° C.

12. The method according to claim 11, wherein the carbon/phenolic preform is formed by a method selected from the group of consisting of:

press molding, tape wrapping with internal and external compression sewing 2-dimensional fabrics with thermal resistant fiber to make 3-dimensional preform, and involute method.

13. The method according to claim 11, wherein the carbonization and the heat processing are performed at the same time in the step 3).

14. The method according to claim 11, wherein a discharge passage of dissolute gas is made by making holes on the hardened preform in the step 3).

15. The method according to claim 14, wherein the discharge passage is made by making holes of 0.5 mm~1.5 mm diameter with 5 mm~20 mm interval if the hardened preform is rectangular box shape.

16. The method according to claim 14, wherein the discharge passage is made by making holes of 0.5 mm~1.5 mm diameter with 5 mm~20 mm interval if the hardened test piece is hollow cylinder shape.

17. The method according to claim 11, wherein graphite and coke powder are put into a graphite box with a hole and wrap up the entire surface of the hardened preform as thick as 1.5 times of maximum thickness of the hardened reform when carbonization and heat processing are performed in the step 3).

18. The method according to claim 11, wherein high purity metal silicon of 98%~99.9% silicon purity is used as 110%~130% weight comparing to that of carbonized product.

19. The method according to claim 11, further comprising a step of coating boron nitride compound composed of 70~80% BN, 10~20% acetone, 0~10% water on the surface of hardened preform after the step 4) is finished.

* * * * *